March 13, 1956     A. R. MORRISON     2,737,947
THERAPEUTIC GENERATOR HYDROXYL IONIZER
Filed Jan. 4, 1951
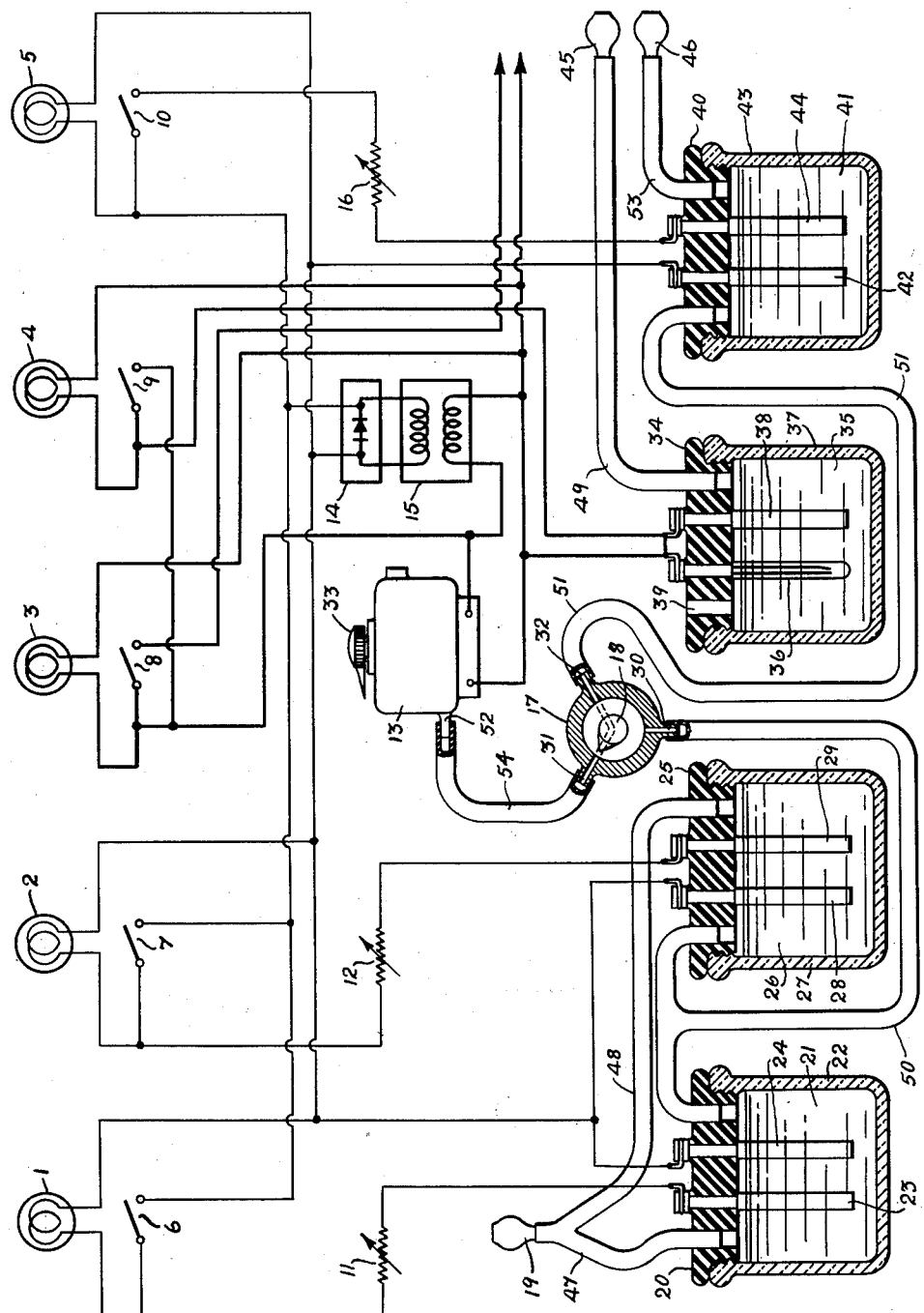
INVENTOR
ALAN R. MORRISON
PER
ATTORNEY

United States Patent Office 2,737,947
Patented Mar. 13, 1956

2,737,947

THERAPEUTIC GENERATOR HYDROXYL IONIZER

Alan R. Morrison, Los Angeles, Calif.

Application January 4, 1951, Serial No. 204,338

4 Claims. (Cl. 128—191)

The present invention relates to an improved inhalator for producing nascent chlorine gas substantially free from irritation for therapeutic administration to patients suffering from respiratory infections.

One object of the present invention is to provide an inhalator device which will produce a combination of gases which will cause substantially no irritation when administered to the respiratory organs of the human body, and which can be produced from a very minute quantity to any desired strength, depending on the tolerance of the patient being treated, together with controls for controlling the strength of the gas. In carrying out this object, I provide two small capacity electrolyte reservoirs, one containing an electrolyte having a high degree of ionization, which, when the electric current is applied to the electrodes contained therein, will produce chlorine gas and an electrolyte in the other reservoir, which, when an electric current is applied to the electrodes contained therein, will produce a gas, which, when mixed with the former gas, forms a non-irritating gas suitable for use in treating respiratory infections.

Another object of the invention is to provide a third small capacity electrolyte reservoir containing a weak electrolyte which has a low degree of ionization for administration to a patient, following treatment with the nascent chlorine gas previously described, for neutralizing the constriction of the bronchi and to act as a stimulant and an expectorant to relieve by relaxing the bronchial spasm.

Other and further objects and advantages of the present invention will be apparent from the following description and the accompanying drawing which illustrates a preferred embodiment of my present invention.

The inhalator comprises three small capacity electrolyte reservoirs 22, 27 and 43 and a small capacity reservoir 37 (hereinafter referred to as the vapor unit) to provide for a vaporizing unit to be more particularly described. Each of the foregoing reservoirs is provided with hard rubber or plastic screw type lids or covers, 20, 25, 34 and 40 respectively. Suspended from the cover 20 is a pair of carbon electrodes 23, 24; from the cover 25 is suspended carbon electrodes 28, 29 and from the cover 40 is suspended a pair of carbon electrodes 42, 44. Suspended from the cover 34 of the unit 37 is a 110 volt heater element 38 which is controlled by a glass enclosed thermostat 36.

The reservoirs 22, 27 are provided with conduits 47, 48 respectively connected to a single nasal tip 19 so that the gaseous products of both chambers may be simultaneously administered to a patient. The reservoir 22 is about three-fourths full of a saturated solution of sodium chloride (NaCl) which is identified by the reference numeral 21. When the electrodes 23, 24 are energized as hereinafter described by six volts D. C. current, the NaCl is broken into its respective elements; chlorine being evolved on the positive pole and sodium being evolved on the negative pole. When I say that sodium is evolved on the negative pole, I mean the following action takes place. Normally, atoms of sodium are deposited on the negative pole but as hydrogen gas is also evolved on the negative pole, some of the sodium escapes with the hydrogen.

The reservoir 27 is about three-fourths full of sodium hydroxide solution (NaOH) or sodium carbonate solution identified in the drawings as solution 26. NaOH is also a strong electrolyte and when the electrodes 28 and 29 are energized with 6 volts D. C. current as hereinafter described the NaOH is broken up into positive Na and negative OH.

The combined gases produced by the electrolysis of the electrolytes 21, 26 in reservoirs 22 and 27 respectively form a nascent chlorine almost free of irritation and suitable for use in treating respiratory infections.

The reservoir 43 is filled about three-fourths full of ammonium hydroxide solution (NH₄OH) identified in the drawings by numeral 41 which is a weak electrolyte and has a low degree of ionization. When the electrodes 42 and 44 are energized by the six volts D. C. current as hereinafter described, the NHOH is broken up and the NH₄ being positive ions and OH being the negative ions. The ammonium (NH₄) is evolved by the negative pole electrodes and the OH by the positive electrodes. NH₄OH being a base yields hydroxyl ions. The ammonium hydroxyl solution is covered with a thin layer of oil, the oil being analgesic balm in a volatile petroleum base. The oil keeps the ammonium fumes from building up within the reservoir when not in use. The gas generated in the reservoir 43 is delivered to the patient through tube 53 and nasal tip 46. The purpose of the reservoir and the electrolyte which it contains is for use when treating patients suffering from asthma and bronchial asthma. The non-irritating gas consisting of the combination of gases from the reservoirs 22 and 27 sometimes causes a constriction of the bronchi. The gas produced in the reservoir 43 neutralizes this condition by acting as a stimulant and an expectorant to relieve the patient's distress by relaxing the bronchial spasm.

The vapor unit 37 is provided with a conduit 49 which has at the end thereof a nasal tip 45. It is also provided with an air inlet 39 in the cover 34 which allows air to enter the unit 37 when the patient inhales from the nasal tip 45. The unit 37 is about three-fourths full of water with a small amount of eucalyptus oil and menthol crystals added identified in the drawings as solution 35.

The means for supplying air under low pressure to the gas chamber of the reservoirs and to the vapor producing unit hereinbefore described consists of an aerator such as a vibrator type of pump that builds up a very low pressure. A suitable pump for this purpose is the one that is shown in the United States Patent No. 2,186,564. This vibrator pump which is denoted by the numeral 13 builds up a pressure of about two pounds which is very satisfactory for use in my inhalator. The pressure can be regulated by the control 33 on the top of the pump. The pump operates on 110 volts A. C. current, the circuit for which will be hereafter described. The pump 13 is connected to the reservoirs 22, 27 and 43 by the conduit 54, two way valve 17 and conduits 50, 51. The conduit 54 is connected to the nipple 52 of the pump 13 and to the nipple 31 of the two way valve 17. The conduit 50 which delivers air to both the reservoirs 22, 27 is connected to nipple 30 of the two way valve 17 and the conduit 51 which delivers air to the reservoir 43 is connected to the nipple 32 of the two way valve 17. Delivery of air through the conduits 50 and 51 is controlled by the valve stem 18.

The electric circuit for the various parts will now be described in detail. As part of the apparatus operates on 110 volts A. C. and another part operates on six volts D. C., I have shown the 110 volts circuit in heavy lines and the six volts circuit by light lines in order that the various circuits may be readily distinguished and be followed with ease. The vapor unit 37 is operated on 110 volts A. C., its operation being controlled by switch 9. As soon as the switch 9 is closed it also closes the circuit to the pilot light 4 which shows that the heating element 38 in the vapor unit 37 is in operation. The pump 13 is also operated on 110 volts A. C. and its operation is controlled by switch 8 which also controls the pilot light 3.

For reducing the voltage and converting the 110 A. C. to 6 volts D. C. there is provided a transformer 15 and a converter 14, the operation of which is also controlled by the switch 8.

The circuit to the reservoirs 22, 27 and 43 are shown in light lines. The electrical circuit for the electrodes in the reservoir 22 is controlled by the switch 6 and the rheostat 11, the switch 6 also controlling the circuit to the pilot lamp 1 which indicates that the circuit is closed to the electrodes 23, 24 for the production of gas from the electrolyte contained therein.

The circuit to the electrodes contained within the reservoir 27 is controlled by the electric switch 7 and rheostat 12, the switch 7 also controlling the pilot light 2 which when the switch is closed indicates that the electrodes 28 and 29 are in operation.

The electrical circuit to the electrodes contained within the reservoir 43 is controlled by the switch 10 and rheostat 16, the switch 10 also controlling the operation of the pilot light 5 which indicates, when the switch is closed, that the electrodes 42 and 44 are in operation.

It will be seen from the foregoing description of the various parts entering into the apparatus can be operated in a manner most suitable to the patient receiving the treatment. For example, the volume and strength of the combination of ionized gases produced from the electrolyte in the reservoirs 22, 27 can be controlled at will by the rheostats 11, 12 and their pressure and amount of dilution with air may be regulated as required by the regulator 33 associated with the pump 13. This is very important since the strength of the gas being used in any particular treatment must be controlled so as to meet the tolerance for the said gas of the patient being treated. The gas produced by the electrodes 42, 44 contained within the reservoir 43 has its strength regulated by air received from the pump 13 and also the amount of ammonia produced is controlled by rheostat 16.

What I claim as new and desire to protect by Letters Patent of the United States is:

1. An inhalator comprising at least two small capacity electrolyte reservoirs, one reservoir containing a solution of sodium chloride and the other containing a solution selected from the hydroxides and carbonates of sodium, a closure for each reservoir, a pair of electrodes consisting of a cathode and an anode mounted in each reservoir, a single gas chamber in the upper part of each reservoir for collecting the gases evolved during the electrolysis of the electrolyte, an inhaler tube communicating with each gas chamber, said tube being joined to a common delivery tip for the simultaneous delivery to a patient of the gases generated in both reservoirs, means for supplying air under low pressure to the gas chambers, a low voltage transformer and a low amperage rectifier in circuit with said transformer and with said electrodes for supplying low voltage direct current to said electrodes from a relatively high-voltage A. C. source of electric current and rheostat control means for the electrodes.

2. An inhalator comprising at least two small capacity electrolyte reservoirs, one reservoir containing a solution of sodium chloride and the other containing a solution selected from the hydroxides and carbonates of sodium, a closure for each reservoir, a pair of electrodes consisting of a cathode and an anode mounted in each reservoir, a gas chamber in the upper part of each reservoir for collecting the gases evolved during the electrolysis of the electrolyte, an inhaler tube communicating with each gas chamber, said tube being joined to a common delivery tip for the simultaneous delivery to a patient of the gases generated in both reservoirs, an aerator for supplying air under low pressure to the gas chambers, a low voltage transformer and a low amperage rectifier in circuit with said transformer and with said electrodes for supplying low voltage direct current to said electrodes from a relatively high voltage A. C. source of electric current and rheostat control means for the electrodes.

3. An inhalator comprising at least two small capacity electrolyte reservoirs, one reservoir containing a solution of sodium chloride and the other containing a solution of a sodium compound, a closure for each reservoir, a pair of electrodes consisting of a cathode and an anode mounted in each reservoir, a gas chamber in the upper part of each reservoir for collecting the gases evolved during the electrolysis of the electrolyte, an inhaler tube communicating with each gas chamber, said tube being joined to a common delivery tip for the simultaneous delivery to a patient of the gases generated in both reservoirs, an aerator, means for selectively supplying air under low pressure from the aerator to the gas chambers, a low voltage transformer and a low amperage rectifier in circuit with said transformer and with said electrodes for supplying low voltage direct current to said electrodes from a relatively high voltage A. C. source and rheostat control means for the electrodes.

4. A portable inhalator comprising three small capacity electrolyte reservoirs, the first reservoir containing a solution of sodium chloride, the second containing a solution of a sodium compound and the third containing a solution of ammonium hydroxide, a closure for each reservoir, an anode and a cathode mounted in each reservoir, a gas chamber in the upper part of each reservoir, an inhaler tube communicating with each gas chamber, the first two mentioned reservoirs being joined to a common delivery tip for the simultaneous delivery to a patient of gas generated in said reservoirs, an aerator means for supplying air under low pressure from the aerator to the gas chambers, valve control means for selectively controlling the delivery of air to the gas chambers, a low voltage transformer and a low amperage rectifier in circuit with said transformer and with said electrodes for supplying low voltage direct current to said electrodes from a relatively high voltage A. C. source of electric current and rheostat control means for the electrodes.

References Cited in the file of this patent

UNITED STATES PATENTS

| | | |
|---|---|---|
| 2,099,801 | Everson | Nov. 23, 1937 |
| 2,256,212 | Morrison | Sept. 16, 1941 |
| 2,479,967 | Risch | Aug. 23, 1949 |